US007607855B2

(12) United States Patent
Lai

(10) Patent No.: US 7,607,855 B2
(45) Date of Patent: Oct. 27, 2009

(54) POSITIONING SLEEVE FOR A TELESCOPIC ROD

(76) Inventor: Hsin-Yuan Lai, No. 3, Tzuenan Rd., Shengang Shiang, Taichung (TW)

( * ) Notice: Subject to any disclaimer, the term of this patent is extended or adjusted under 35 U.S.C. 154(b) by 23 days.

(21) Appl. No.: 11/653,631

(22) Filed: Jan. 16, 2007

(65) Prior Publication Data

US 2008/0168627 A1 Jul. 17, 2008

(51) Int. Cl.
*F16B 7/10* (2006.01)

(52) U.S. Cl. .................................... 403/109.5; 403/368

(58) Field of Classification Search ... 403/109.1–109.6, 403/109.8, 293, 329, 377, 366–368, 372, 403/378, 379.1, 379.2, 379.4, 379.5, 359.1, 403/359.4, 359.5; 428/34.1, 36.9; 464/162; 277/607, 648, 649
See application file for complete search history.

(56) References Cited

U.S. PATENT DOCUMENTS

| | | | | |
|---|---|---|---|---|
| 3,083,041 | A | 3/1963 | Olov | |
| 3,645,569 | A * | 2/1972 | Reilly | 403/4 |
| 4,077,636 | A * | 3/1978 | Langford | 277/503 |
| 4,329,076 | A * | 5/1982 | Coreth | 403/109.8 |
| 4,378,172 | A | 3/1983 | Groschupp | |
| 4,379,707 | A * | 4/1983 | Fisher | 464/162 |
| 4,636,106 | A * | 1/1987 | Waisbrod | 403/228 |
| 4,667,530 | A * | 5/1987 | Mettler et al. | 74/493 |
| 4,791,826 | A * | 12/1988 | Behrens | 74/473.3 |
| 5,525,112 | A * | 6/1996 | Smith | 464/162 |
| 5,709,605 | A * | 1/1998 | Riefe et al. | 464/83 |
| 6,106,070 | A * | 8/2000 | Ritt et al. | 297/411.35 |
| 6,354,629 | B1 * | 3/2002 | McNeal et al. | 280/823 |
| 6,840,865 | B2 * | 1/2005 | Lentini et al. | 464/133 |
| 7,004,844 | B2 * | 2/2006 | Fraher | 464/162 |
| 7,111,574 | B2 * | 9/2006 | Slatter | 114/255 |
| 2005/0163559 | A1 * | 7/2005 | Chang | 403/109.3 |

FOREIGN PATENT DOCUMENTS

| | | | |
|---|---|---|---|
| EP | 0 027 241 | A1 | 4/1981 |
| EP | 0417011 | A1 | 3/1991 |

* cited by examiner

*Primary Examiner*—Daniel P Stodola
*Assistant Examiner*—Joshua T Kennedy
(74) *Attorney, Agent, or Firm*—The Webb Law Firm

(57) ABSTRACT

A positioning sleeve includes first and second surrounding portions adapted to surround outer and inner tube sections of a telescopic rod, respectively. The second surrounding portion has a plurality of angularly spaced-apart recessed parts and a plurality of compressible retaining units respectively disposed in the recessed parts. Each retaining unit is connected to the corresponding recessed part, and has an engaging part projecting toward a through hole in the second surrounding portion, and a deformable space defined between the engaging part and the respective recessed part. The deformable space is deformed when the inner tube section is friction-fitted into the second surrounding portion and when the engaging part of each retaining unit abuts the inner tube section.

4 Claims, 9 Drawing Sheets

POSITIONING SLEEVE FOR A TELESCOPIC ROD

BACKGROUND OF THE INVENTION

1. Field of the Invention

The invention relates to a positioning sleeve, more particularly to a positioning sleeve for a telescopic rod.

2. Description of the Related Art

FIGS. 1 and 2 illustrate a hiking stick or cane incorporating conventional positioning sleeves 3. The hiking stick includes a handle 1, and a cane body 2 fixed to the handle 1. The cane body 2 includes a plurality of interconnected tube sections 201, and a conventional positioning sleeve 3 provided on each of two interconnected tube sections 201. Through telescopic connections of the tube sections 201, the cane body 2 can be extended to a desired length for use and can be shortened for storage. The purpose of the positioning sleeve 3, aside from enhancing an appearance of the connection between interconnected pairs of the tube sections 201, is to retard retraction of the interconnected tube sections 201 and to permit smooth telescopic movement thereof. The positioning sleeve 3 has an inner peripheral surface provided with a plurality of angularly spaced-apart anti-slip strips 301 projecting therefrom. The anti-slip strips 301 provide friction to an inner one of the tube sections 201 so as to retard the movement of the inner tube section 201 to a retracted position.

Although the anti-slip strips 301 of the conventional positioning sleeve 3 can provide frictional positioning of the tube sections 201, the formation of the anti-slip strips 301 requires high accuracy so as to permit frictional fitting of the corresponding tube section 201. As such, a defective rate of the conventional positioning sleeve 3 is high. Further, the anti-slip strips 301 may wear due to frequent use, so that a retardation effect thereof is deteriorated.

SUMMARY OF THE INVENTION

Therefore, the object of the present invention is to provide a positioning sleeve for a telescopic rod that can be manufactured easily with a low defective rate and that provides for a good retardation effect, even after long use.

According to this invention, a positioning sleeve is adapted to be applied to a telescopic rod, which has an outer tube section and an inner tube section connected telescopically to the outer tube section. The positioning sleeve comprises a sleeve body having a first surrounding portion adapted to surround the outer tube section, and a second surrounding portion adapted to surround the inner tube section. The second surrounding portion has an inner peripheral wall defining a through hole, a plurality of angularly spaced-apart recessed parts provided in the inner peripheral wall, and a plurality of compressible retaining units respectively disposed in the recessed parts and adapted to abut the inner tube section. Each of the retaining units is connected to one of the recessed parts, and has an engaging part projecting toward the through hole, and a deformable space defined between the engaging part and a respective one of the recessed parts. The deformable space is deformed when the inner tube section is friction-fitted into the sleeve body and when the engaging part of each retaining unit abuts the inner tube section.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
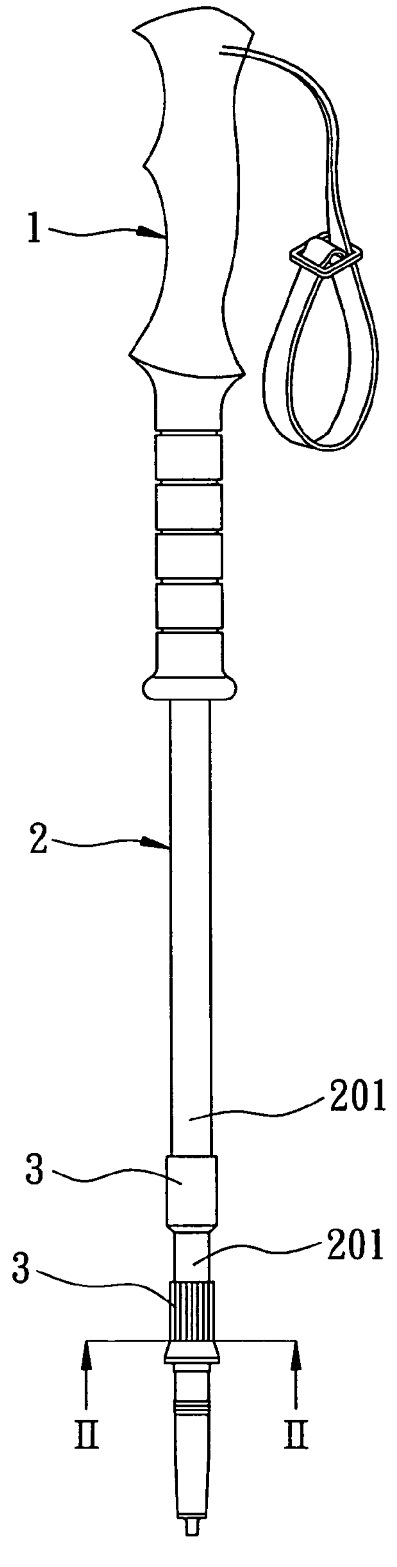
FIG. 1 PRIOR ART
FIG. 1 is a schematic view of a hiking stick or cane incorporating a conventional positioning sleeve.
Figure 2:
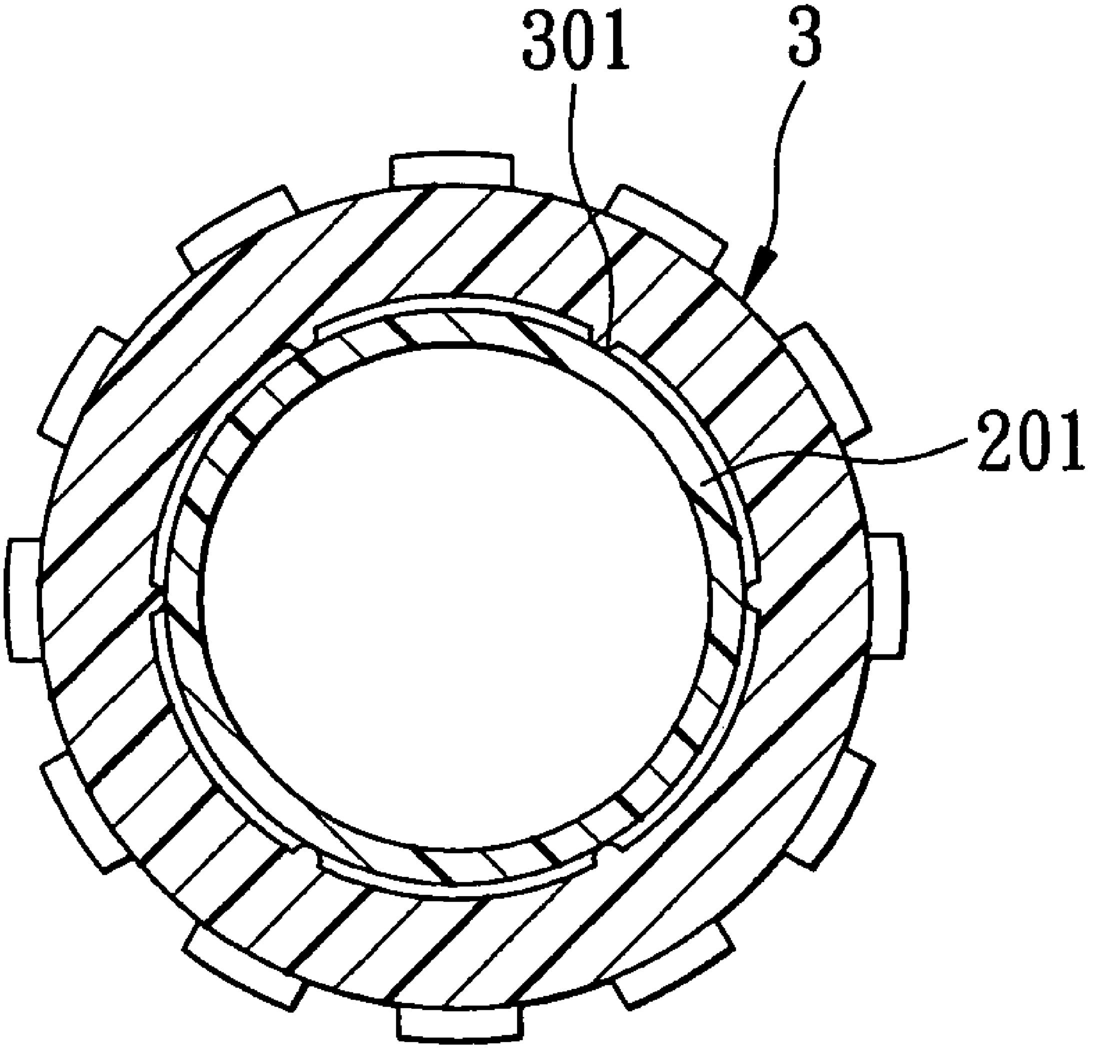
FIG. 2 PRIOR ART
FIG. 2 is a sectional view taken along line II-II of FIG. 1.
Figure 3:
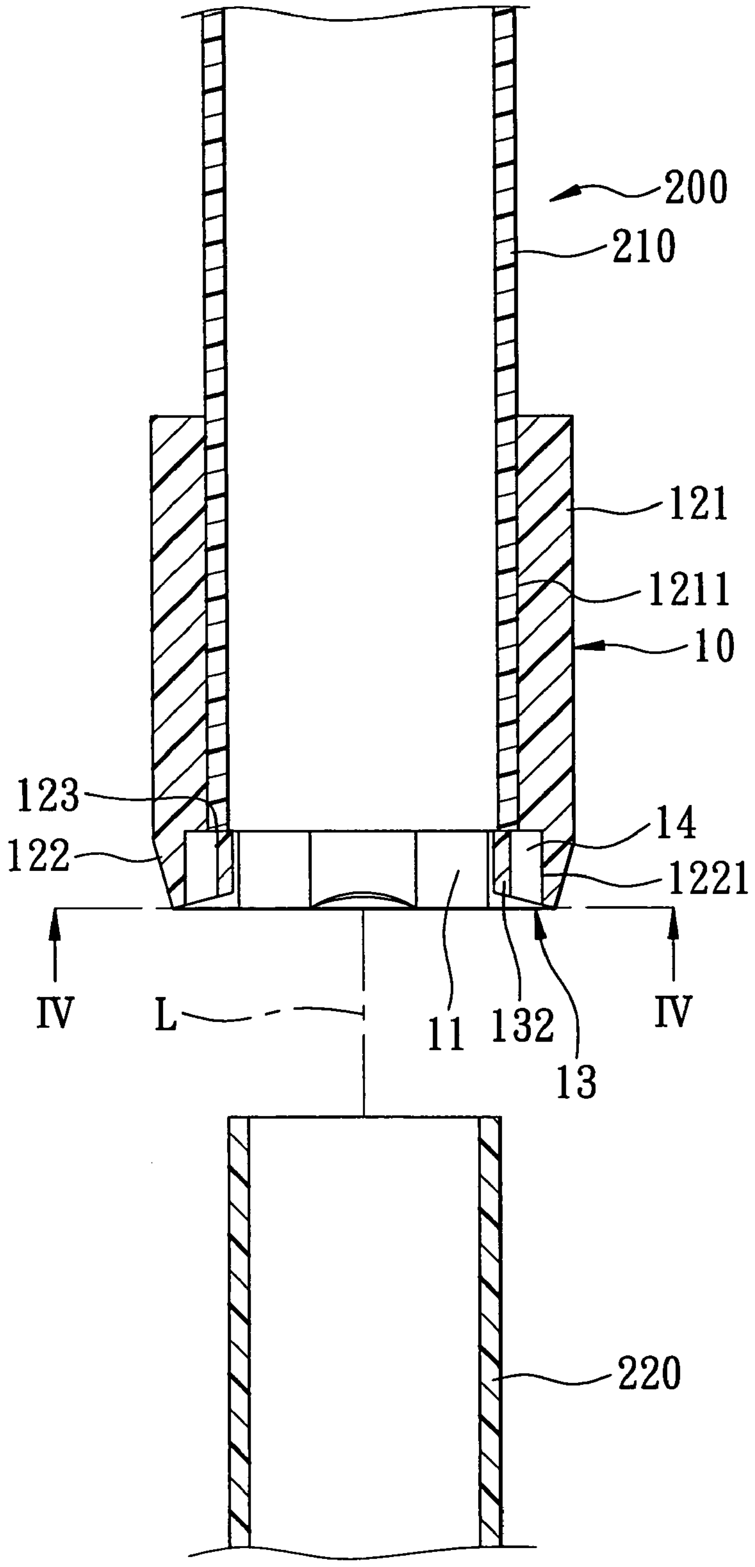
FIG. 3 is a fragmentary exploded sectional view of outer and inner tube sections of a telescopic rod incorporating a positioning sleeve according to the first preferred embodiment of the present invention.

Before the present invention is described in greater detail, it should be noted that same reference numerals have been used to denote like elements throughout the specification.

Referring to FIGS. 3 to 7, the first preferred embodiment of a positioning sleeve 10 according to the present invention is adapted to be applied on a telescopic rod 200. The telescopic rod 200 has an axis (L), and includes an outer tube section 210, and an inner tube section 220 connected telescopically to the outer tube section 210.

The positioning sleeve 10 comprises a sleeve body having a first surrounding portion 121 adapted to surround the outer tube section 210, and a second surrounding portion 122 adapted to surround the inner tube section 220. The second surrounding portion 122 has an inner peripheral wall 1221 surrounding the axis (L) and defining a through hole 11, a plurality of angularly spaced-apart recessed parts 1222 formed in the inner peripheral wall 1221, and a plurality of compressible retaining units 13 respectively disposed in the recessed parts 1222 and adapted to abut the inner tube section 220. The first surrounding portion 121 has an inner peripheral wall 1211 with a diameter larger than a diameter of the inner peripheral wall 1221 of the second surrounding portion 122. The sleeve body further has a shoulder portion 123 formed between the inner peripheral walls 1211, 1221 of the first and second surrounding portions 121, 122.

Figure 4:
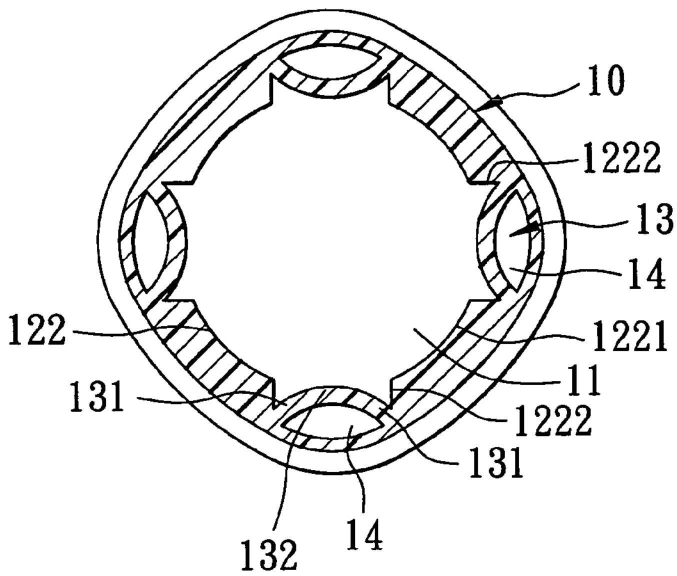
FIG. 4 is a sectional view of the first preferred embodiment taken along line IV-IV of FIG. 3.
Figure 5:
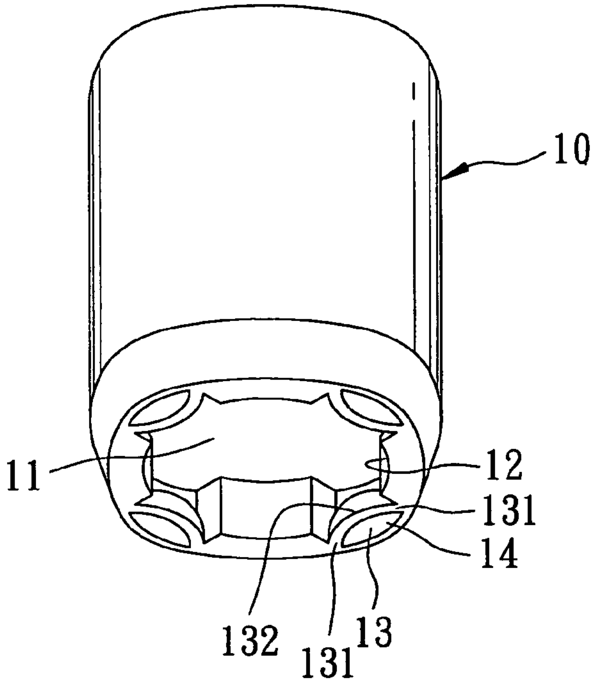
FIG. 5 is a perspective view of the first preferred embodiment.

As best shown in FIGS. 4 and 5, each of the retaining units 13 has two ends 131 that are opposite to each other in an angular direction and that are connected to the respective recessed part 1222, an engaging part 132 connected between the ends 131, and a deformable space 14 defined between the engaging part 132 and a respective one of the recessed parts 1222. The engaging part 132 is a convex surface protruding toward the through hole 11 between the two ends 131.

Figure 6:
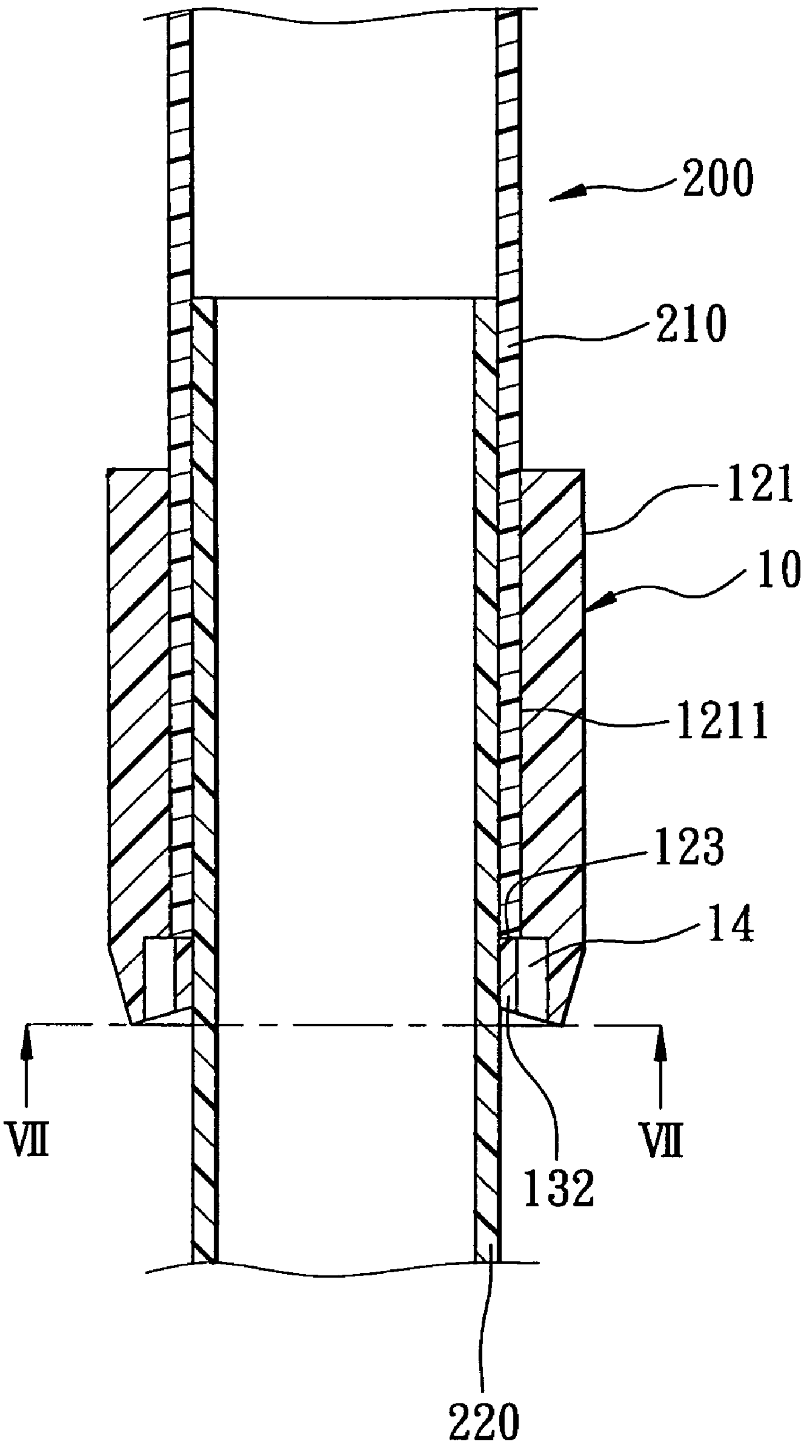
FIG. 6 is a fragmentary assembled sectional view of the telescopic rod and the positioning sleeve of the first preferred embodiment.
Figure 7:
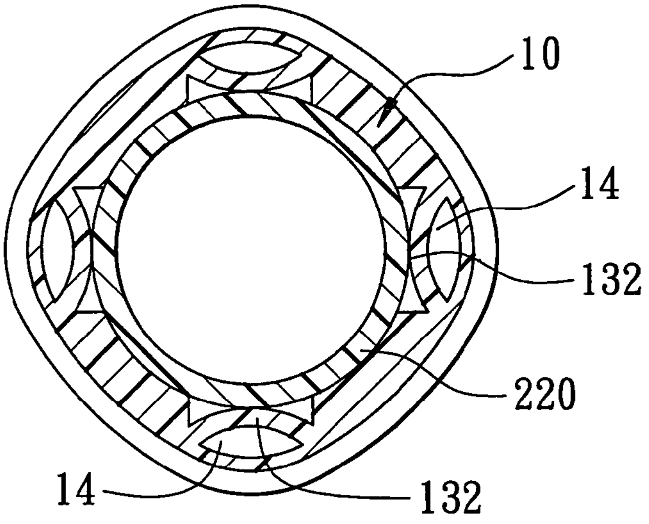
FIG. 7 is an assembled sectional view of the inner tube section of the telescopic rod and the positioning sleeve of the first preferred embodiment taken along line VII-VII of FIG. 6.

With reference to FIGS. 6 and 7, after the telescopic rod 200 and the positioning sleeve 10 are assembled, the outer tube section 210 is inserted into the first surrounding portion 121 of the positioning sleeve 10 with a bottom end thereof abutting against the shoulder portion 123 so as to obtain an axial positioning. The inner tube section 220 is friction-fitted into the sleeve body with a top end thereof passing through the through hole 11 and into an inner portion of the outer tube section 210. At this time, the engaging parts 132 of the retaining units 13 abut against and are pressed by the inner tube section 220 so as to deform the deformable spaces 14 in the retaining units 13. Because the retaining units 13 produce restoring forces when displaced in this manner, the engaging parts 132 of the retaining units 13 compress radially and resiliently the inner tube section 220, and thereby produce a retarding effect. Hence, when the length of the telescopic rod 200 is shortened, sliding movement of the inner tube section 220 with respect to the outer tube section 210 is retarded.

Therefore, the positioning sleeve 10 of the present invention not only can enhance the appearance of the interconnected outer and inner tube sections 210, 220, but also can provide frictional positioning of the inner tube section 220 through the presence of the retaining units 13. Even after frequent use, wear of the engaging parts 132 is limited, and if wear does occur, the deformable spaces 14 can automatically compensate for the wear. Further, high accuracy during formation of the retaining units 13 is not necessary so that the defect rate can be reduced. Additionally, the positioning sleeve 10 maintains spacing between the ends of the interconnected outer and inner tube sections 210, 220 when the inner tube section 220 is forced to retract into the outer tube section 210. Further, smooth sliding movement of the outer and inner tube sections 210, 220 relative to each other can be achieved.

Figure 8:
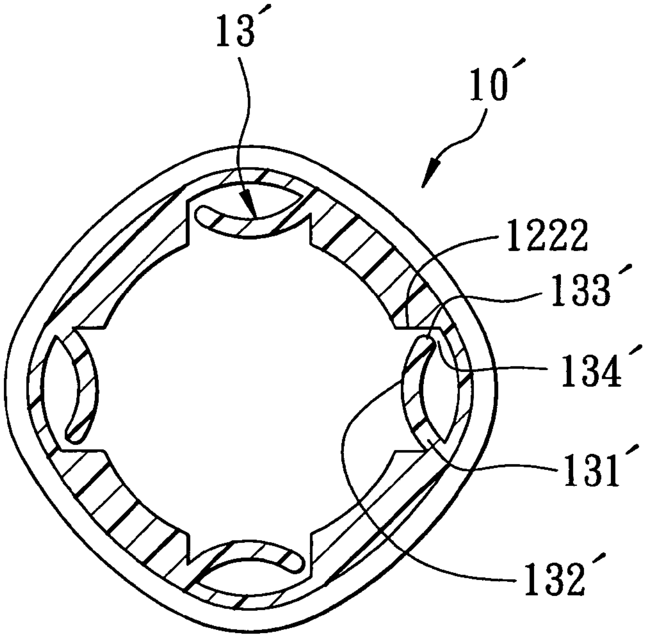
FIG. 8 is a sectional view of a positioning sleeve according to the second preferred embodiment of the present invention.

Referring to FIG. 8, a positioning sleeve 10' according to the second preferred embodiment of the present invention is shown to be similar to the first preferred embodiment. However, in this embodiment, each of the retaining units 13' has a fixed end 131' connected to the respective recessed part 1222, a movable free end 133' that is spaced apart from the corresponding recessed part 1222 so that a slit 134' is formed therebetween, and an engaging part 132' connected between the fixed end 131' and the movable free end 133'. The advantages of the first preferred embodiment can be similarly achieved using the second preferred embodiment.

Figure 9:
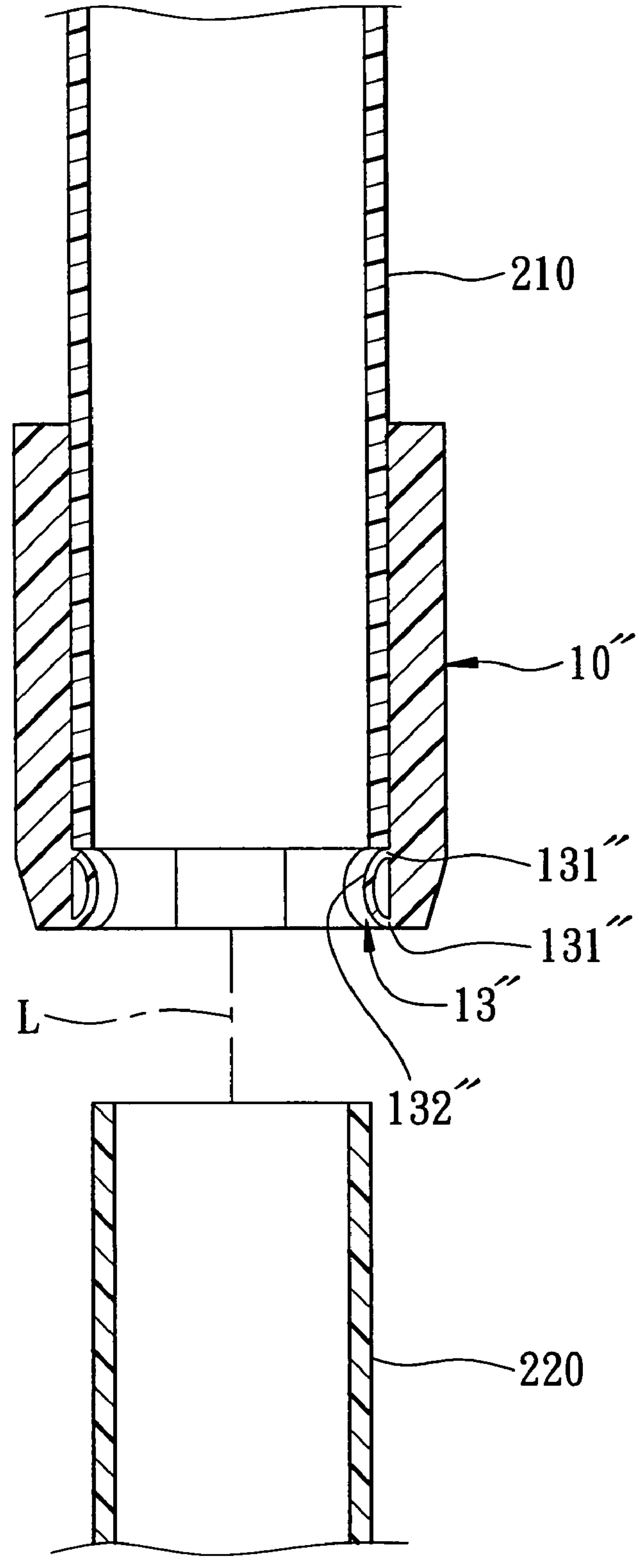
FIG. 9 is a fragmentary exploded sectional view of outer and inner tube sections of a telescopic rod incorporating a positioning sleeve according to the third preferred embodiment of the present invention.
Figure 10:
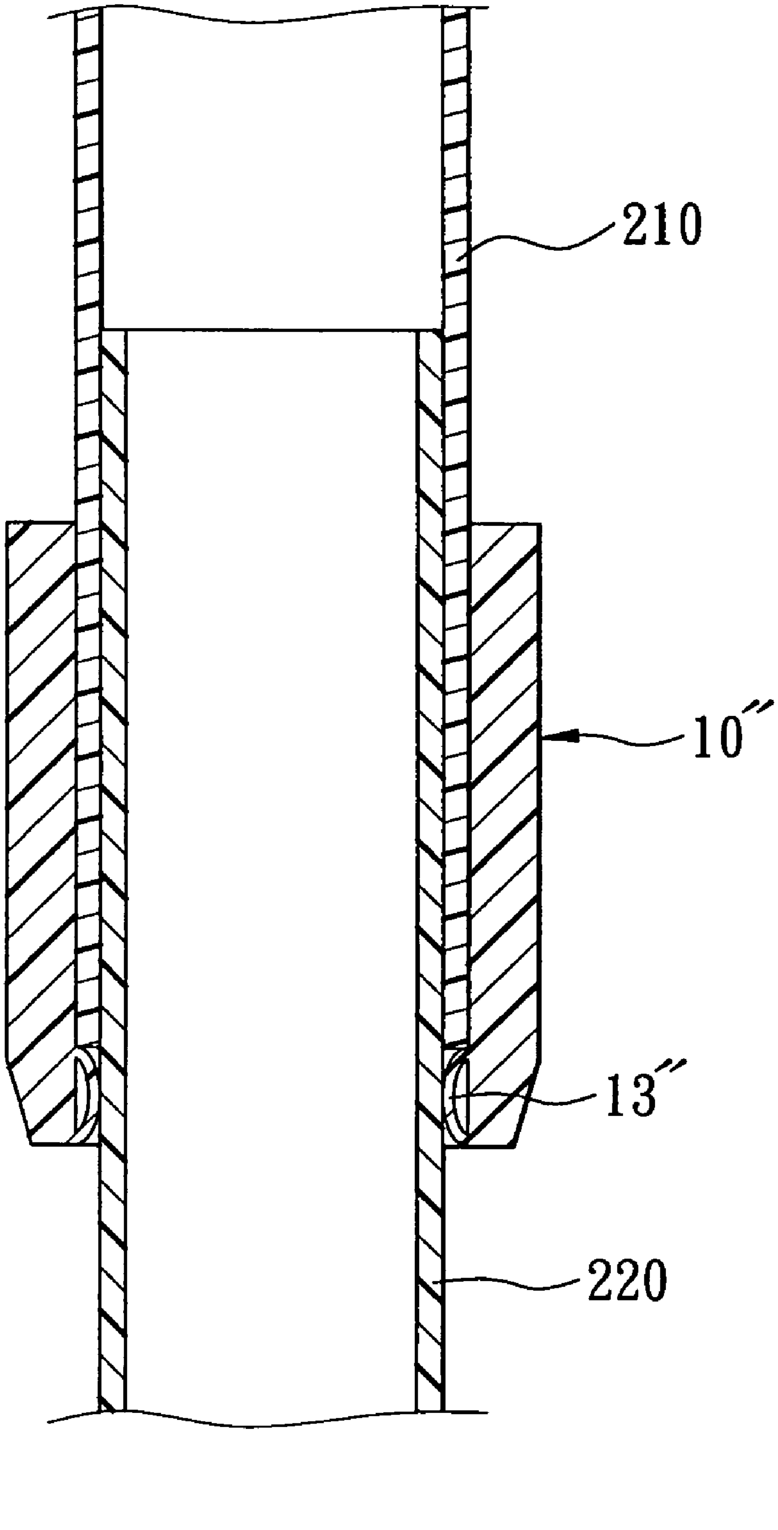
FIG. 10 is an assembled sectional view of the outer and inner tube sections of the telescopic rod and the positioning sleeve of the third preferred embodiment.

Referring to FIGS. 9 and 10, a positioning sleeve 10" according to the third preferred embodiment of the present invention is shown to be similar to the first preferred embodiment. However, in this embodiment, each of the retaining units 13" has two ends 131" that are opposite to each other in an axial direction and that are connected to the respective recessed part 1222 (see FIG. 4), and an engaging part 132" being a convex surface between the ends 131". The retaining units 13" are resilient, and thus can retard movement of the inner tube section 220 relative to the outer tube section 210.

Figure 11:
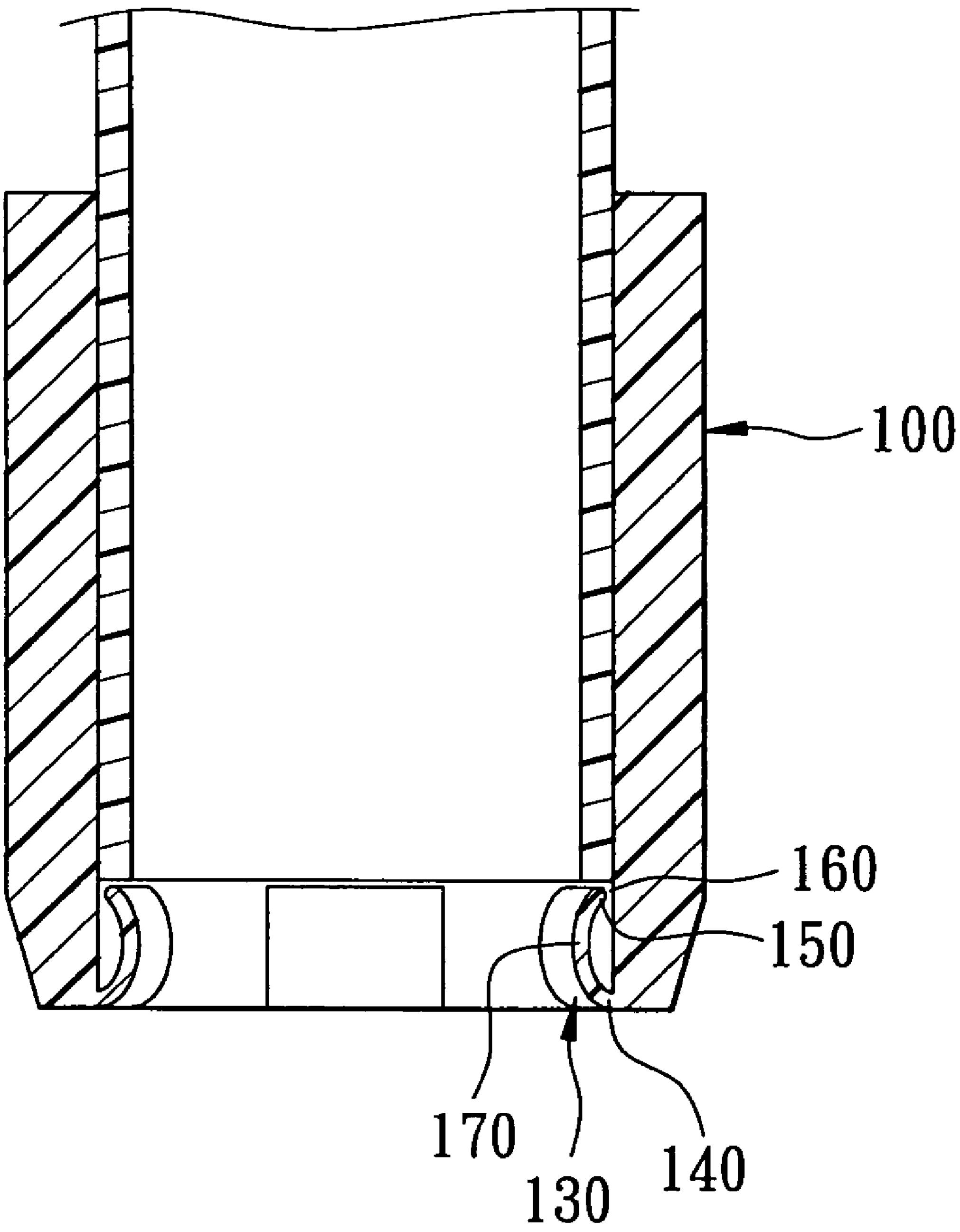
FIG. 11 is a sectional view of a positioning sleeve according to the fourth preferred embodiment of the present invention, shown in a state sleeved on an outer tube section of a telescopic rod.

Referring to FIG. 11, a positioning sleeve 100 according to the fourth preferred embodiment of the present invention is shown to be similar to the third preferred embodiment. However, in this embodiment, each of the retaining units 130 has a fixed end 140 connected to the respective recessed part 1222 (see FIG. 4), a movable free end 150 that is spaced apart from the corresponding recessed part 1222 so that a slit 160 is formed therebetween, and an engaging part 170 connected between the fixed end 140 and the movable free end 150. The retaining units 130 are resilient. Hence, the advantages described in the aforementioned preferred embodiments can be similarly achieved using the fourth preferred embodiment.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A positioning sleeve for a telescopic rod, which has an outer tube section and an inner tube section connected telescopically to the outer tube section, said positioning sleeve comprising:

a sleeve body having a first surrounding portion adapted to surround the outer tube section, and a second surrounding portion adapted to surround the inner tube section, said second surrounding portion having an inner peripheral wall defining a through hole, a plurality of angularly spaced-apart recessed parts that are recessed from said inner peripheral wall and that each has a recessed surface facing said through hole, and a plurality of compressible retaining units respectively disposed on said recessed surfaces of said recessed parts and adapted to abut the inner tube section, each of said retaining units being formed as a flexible plate and having an engaging part projecting toward said through hole, and a deformable space defined between said flexible plate and said recessed surface of a respective one of said recessed parts, said deformable space being deformed when the inner tube section is friction-fitted into said sleeve body and when said engaging part of each of said retaining units abuts the inner tube section, wherein said flexible plate is convex at said engaging part so as to project toward said through hole, and has two ends disposed on two opposite sides of said engaging part, said engaging part being disposed away from said recessed surface, said two ends extending to said recessed surface, one of said two ends being connected directly to said recessed surface, and the other one of said two ends being a movable free end that is disconnected from said recessed surface of the respective one of said recessed parts.

2. The positioning sleeve of claim 1, wherein said first surrounding portion has an inner peripheral wall with a diameter larger than a diameter of said inner peripheral wall of said second surrounding portion, said sleeve body further including a shoulder portion formed between said inner peripheral walls of said first and second surrounding portions.

3. The positioning sleeve of claim 1, wherein said two ends of said flexible plate are opposite to each other in an angular direction.

4. A positioning sleeve for a telescopic rod, which has an outer tube section and an inner tube section connected telescopically to the outer tube section, said positioning sleeve comprising:

a sleeve body having a first surrounding portion adapted to surround the outer tube section, and a second surrounding portion adapted to surround an inner tube section, said second surrounding portion having an inner peripheral wall defining a through hole, a plurality of angularly spaced-apart recessed parts that are recessed from said inner peripheral wall and that each has a recessed surface facing said through hole, and a plurality of compressible retaining units respectively disposed on said recessed surfaces of said recessed parts and adapted to abut the inner tube section, each of said retaining units being formed as a flexible plate and having an engaging part projecting toward said through hole, and a deformable space defined between said flexible plate and said recessed surface of a respective one of said recessed parts, said deformable space being deformed when the inner tube section is friction-fitted into said sleeve body and when said engaging part of each of said retaining units abuts the inner tube section, wherein said flexible plate is convex at said engaging part so as to project toward said through hole, and has two ends disposed on two opposite sides of said engaging part, said engaging part being disposed away from said recessed surface, said two ends extending to said recessed surface, at least one of said two ends being connected directly to said recessed surface, and wherein said two ends of said flexible plate are opposite to each other in an axial direction.

* * * * *